March 7, 1961 W. H. HAGEDORN 2,973,613
SAFETY GUIDE FOR ROTARY LAWN MOWER
Filed March 27, 1958 2 Sheets-Sheet 1

William Henry Hagedorn
INVENTOR.

March 7, 1961 W. H. HAGEDORN 2,973,613
SAFETY GUIDE FOR ROTARY LAWN MOWER
Filed March 27, 1958 2 Sheets-Sheet 2

William Henry Hagedorn
INVENTOR.

United States Patent Office 2,973,613
Patented Mar. 7, 1961

2,973,613

SAFETY GUIDE FOR ROTARY LAWN MOWER

William Henry Hagedorn, 856 Dixie Highway, Erlanger, Ky.

Filed Mar. 27, 1958, Ser. No. 724,326

7 Claims. (Cl. 56—25.4)

This invention comprises a novel and useful safety guide for a rotary lawn mower and more particularly relates to an attachment to be readily attached to conventional lawn mowers of the rotary type to prevent the accidental passage of the foot or other portion of a person beneath the mower and into proximity with the rotary blade thereof; and for automatically halting operation of the mower when the rear portion of the frame thereof is lifted a predetermined distance above the ground.

The principal object of this invention is to provide a safety device for power operated lawn mowers, and especially lawn mowers of the rotating blade type which will operate to automatically prevent the passage of the foot of the operator from sliding beneath the frame of the mower and into the region of the blade; and will further discontinue operation of the power plant of the mower upon lifting the rear end of the mower above a predetermined distance from the ground.

A further object of the invention is to provide a safety device in accordance with the preceding object which may be compact and readily attached to various conventional types of lawn mowers.

Yet another object of the invention is to provide a safety device in accordance with the preceding objects wherein the actuating means for effecting discontinuance of the operation of the power plant of the mower shall be mounted upon the attachment in a compact and convenient manner and shall be operated upon predetermined movement of the guard member of the attachment.

A still further object of the invention is to provide an attachment for power operated lawn mowers as set forth hereinbefore which will admit of ready adjustment of the range throughout which the attachment is capable of discontinuing operation of the lawn mower power plant.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

The objects and features of this invention are realized through the provision of a safety device which may be readily applied as an attachment to conventional power operated lawn mowers of the horizontally rotating blade type, the attachment comprising a mounting plate secured conveniently to the rear portion of the frame of the lawn mower for vertical adjustment thereon, a guard plate hinged to the mounting plate for swinging movement about a horizontal axis, a supporting roller mounted on the guard plate and constituting a gauging means for retaining the guard plate at a fixed distance above the ground, a control means carried by the mounting plate for discontinuing operation of the power plant and actuating means operatively engaging the guard plate and the control means for effecting operation of the latter and cessation of operation of the power plant of the lawn mower upon a predetermined downward tilting of the guard plate relative to the lawn mower frame.

Figure 3:
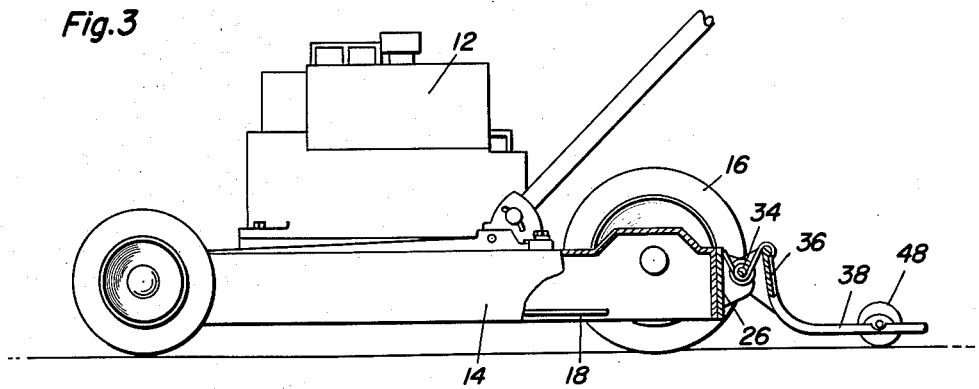
Figure 3 is a side elevational view of the lawn mower in normal mowing position, a portion of the rear thereof being broken away and shown in section to illustrate the mounting of the attachment and the position of its parts.
Figure 4:
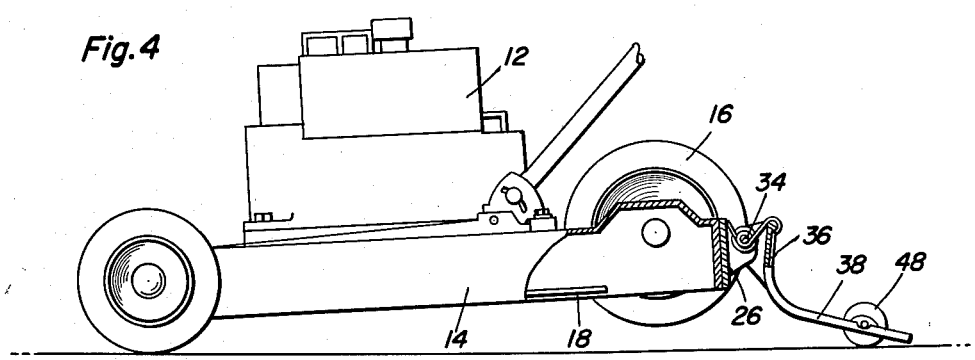
Figure 4 is a view similar to Figure 3 but showing the position of the parts when the rear end of the lawn mower is raised sufficiently to effect actuation of the shut-off means forming a part of the attachment.

In the accompanying drawings, the numeral 10 designates generally a power operated lawn mower of a conventional type, the same including a power plant indicated respectively at 12 which may comprise a gasoline engine, a lawn mower supporting frame 14 having the usual driving wheels 16 thereon, the power plant operating a horizontally rotating blade 18 beneath the frame, as will be apparent from Figures 3 and 4, it being understood that the power plant is provided with an ignition system, not shown, of a conventional design.

The safety device is indicated generally by the numeral 20 and consists of a mounting plate 22 and a guard plate 24 which are pivotally connected.

Figure 1:
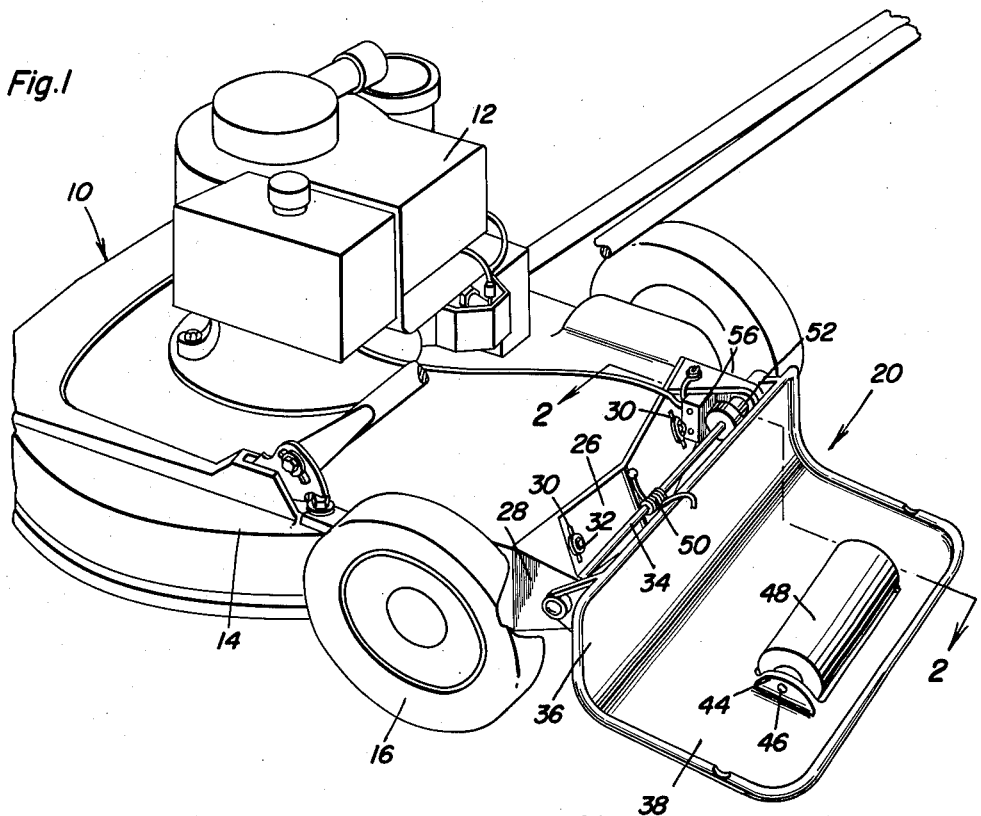
Figure 1 is a perspective view of a conventional type of power operated lawn mower of the rotary blade type and to which the safety device of the present invention has been applied.

The mounting plate 22 includes a base portion 26 contoured to fit against the rear end of the lawn mower frame 14, and has at its opposite ends a pair of rearwardly projecting support brackets 28. As shown in Figure 1, the mounting plate 22 is provided with vertically extending slots 30 and fasteners 32 in the form of bolts or nuts extend through these slots for securing the mounting plate in vertically adjusted position upon the frame 14. By this means the attachment may be vertically adjusted to fit it to different types of mowers and to different operating conditions thereon.

Rotatably received and journaled in the brackets 28 is a horizontal shaft 34 which serves both to pivotally connect the guard plate to the mounting plate for vertically pivoting movement about a horizontal axis, and also serves as a part of the actuating mechanism by which predetermined movement of the guard plate initiates cessation of operation of the power plant of the lawn mower.

The guard plate 24 is preferably of an integral plate like construction including a vertically extending web 36 and a rearwardly horizontally extending portion 38. The vertical flange or web 36 is provided with parallel support arms 40 which are fixedly secured in any suitable manner to the shaft 34 for rocking or rotary movement with this shaft. Thus, as the guard plate is tilted about the horizontal axis of the shaft 34, it will in turn impart a rocking or rotary movement to the shaft for a purpose to be subsequently apparent.

Figure 2:
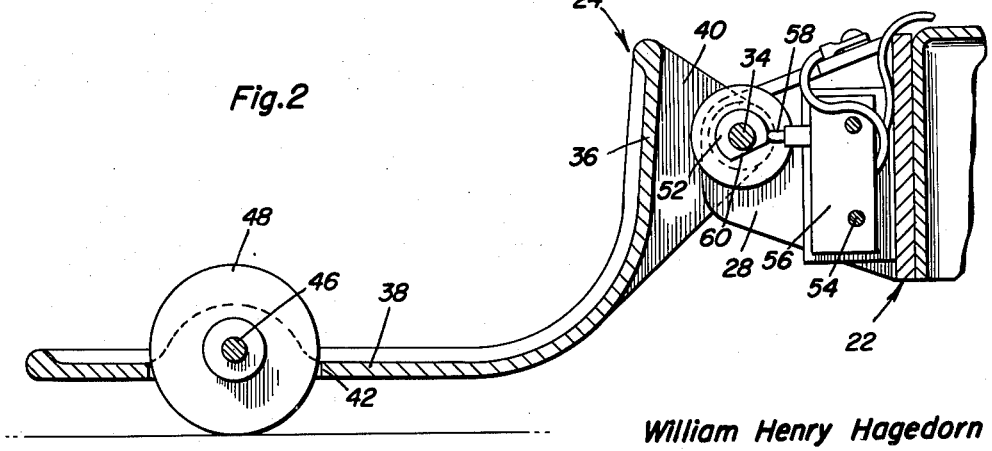
Figure 2 is a detail view in vertical section upon an enlarged scale substantially upon the plane indicated by the section line 2—2 of Figure 1 and showing details of the attachment itself.

The horizontal portion 38 is provided with a transversely elongated slot 42 therein and upwardly projecting brackets 44 are disposed upon the horizontal portion on opposite sides of the slot by means of which the pintles or trunnions 46 of a roll 48 are mounted. The roller 48 as shown in Figure 2 extends through the horizontal portion of the guard plate and constitutes a gauge means which retains the horizontal portion of this guard plate in fixed relation to the ground. However, the guard plate will pivot upwardly and downwardly about the axis of the shaft 34 in accordance with the regularities in the contour of the ground over which the device passes.

A helical spring 50 has a central portion disposed about the shaft 34, and its two arms engaging the mounting plate 26 and the vertical flange 36 of the guard plate to yieldingly urge the latter downwardly about the shaft. While this spring may be of any desired strength, a spring capable of exerting a force of about 25 pounds has been found to be entirely satisfactory for the purposes of this invention. This spring serves not only to retain the gauging means 48 in contact with the ground, but also serves as the means which directly causes actuation of the control means previously referred to.

Figure 5:
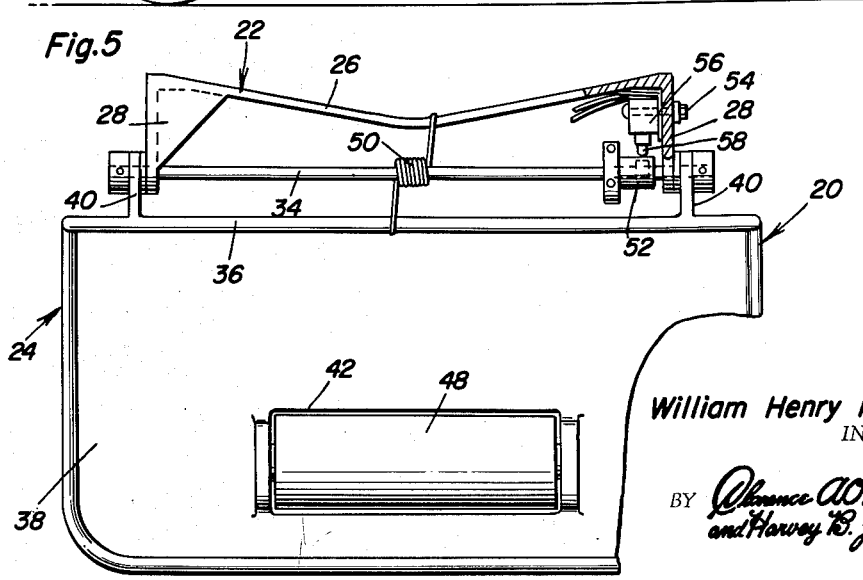
Figure 5 is a top plan view of the attachment, parts being broken away and parts being shown in section.

Referring now especially to Figures 2 and 5 it will be observed that the shaft 34 has rigidly but adjustably secured thereto a cam member 52.

Carried by the mounting plate 26 as by convenient attachment to a bracket 28 thereof by fastening bolts 54 is a control means designated generally by the numeral 56. This control means is of a nature to effectively discontinue operation of the power plant, and the type of power plant shown comprises an electric switch having an operating button 58 disposed in the path of travel of the cam 52 for actuation thereby. The switch is connected by suitable wiring to the ignition circuit of the engine so that when the operator button 58 is maintained depressed by engagement with the main portion of the cam 52, the circuit will remain closed and the power plant be capable of operation. However, when a relieved portion of the cam such as the portion 60, see Figure 2, is moved into engagement with the button 58, the latter will be permitted sufficient movement to open the switch thus breaking the electric circuit of the ignition system of the motor and effecting stopping of the same.

It will now be observed that by practically adjusting the shape and position of the cam 52 and of its relieved portion 60 with respect to the position of the operator button 58 of the control means 56, that a predetermined relative downward swinging movement of the guard plate with respect to the frame of the mower will be effective to cause actuation of the operating means to stop the power plant of the mower. It should be noted that upward tilting movement of the guard plate will not be effective to discontinue operation of the mower power plant, this being a desirable feature since it enables the user to tilt the forward end of the mower in normal operation for trimming around shrubbery, on banks, slopes and the like. Moreover, by properly positioning the cam 52 with respect to the operator button 58, a limited downward tilting of the guard plate is permissible without actuating the control means for stopping the motor. This is desirable since it enables the mower to move over various slopes such as encountered during normal mowing operations.

However, from a comparison of Figures 3 and 4 it will be apparent that when the rear end of the mower is lifted, as when the user slips on the ground, so that his foot might slide under the mower, the guard plate tilts downwardly, blocking access beneath the mower and preventing the passage of his foot therebeneath, while the downward tilting of the guard plate relative to the upward tilting of the frame in turn rotates the shaft 34 and causes the cam 52 to actuate the control means and thus discontinue operation of the mower.

It will also be observed that when the mower is lifted from the ground as by being tilted upon its side, the spring 50 will in turn move the guard plate to position to effect halting of the power plant, thereby increasing the safety with which the user may service the mower and its blade.

It will thus be apparent that there has been provided an attachment which may be conveniently applied to conventional types of lawn mowers of the power operated, horizontally rotating blade type for greatly contributing to the safety of the users of such mowers. The entire device is compact and may be easily attached to such mowers, and may be readily adjusted to fit different types of mowers and different operating conditions.

What is claimed as new is as follows:

1. In combination with a lawn mower including a mower frame and power means for driving rotary blades, an attachment comprising a guard plate pivotally mounted on a horizontal axis at the rear of said mower frame, gauge means on said mower frame supporting said guard plate at a fixed distance above the ground, stop means operatively connected to said power means for extinguishing operation thereof, actuating means connected to said guard plate and to said stop means and operable to halt operation of said power means upon predetermined downward pivoting of said guard plate relative to said mower frame.

2. The combination of claim 1 wherein said guard plate includes a vertical flange disposed in close proximity and to the rear of the mower frame for blocking rearward access to the space therebeneath and a horizontal portion, said gauge means being mounted upon said horizontal portion.

3. The combination of claim 2 wherein said horizontal portion has a slot therethrough, said gauge means including a rotatably journaled roller disposed through said slot.

4. The combination of claim 1 including a mounting plate, and means securing said mounting plate on said mower frame, said securing means defining vertically extending slots in said mounting plate and fasteners extending through said slots and secured to said frame said guard plate pivoted to said mounting plate.

5. The combination of claim 1 including a mounting plate, means securing said mounting plate on said mower frame, and a horizontal shaft journaled on said mounting plate, said guard plate being secured to said shaft for rotation therewith.

6. The combination of claim 5 including spring means mounted on said shaft and engaging said mounting plate and guard plate and urging the latter pivotally downwardly about the axis of said shaft.

7. The combination of claim 5 wherein said actuating means includes a cam fixedly secured to said shaft, said actuating means including an actuator engaging said cam.

References Cited in the file of this patent

UNITED STATES PATENTS

| | | |
|---|---|---|
| 2,466,589 | Holmes | Apr. 5, 1949 |
| 2,476,526 | Badlat | July 19, 1949 |
| 2,490,870 | Heyn | Dec. 13, 1949 |
| 2,613,756 | Smith | Oct. 14, 1952 |
| 2,720,930 | Newhouse et al. | Oct. 18, 1955 |
| 2,736,153 | Dunn | Feb. 28, 1956 |
| 2,759,056 | Challman | Aug. 14, 1956 |
| 2,796,944 | Clement | June 25, 1957 |
| 2,839,627 | Sackett | June 17, 1958 |